Feb. 5, 1929.  
G. B. BURNHAM  
PROCESS OF OBTAINING SODIUM CHLORIDE  
Filed Nov. 16, 1925
1,701,295
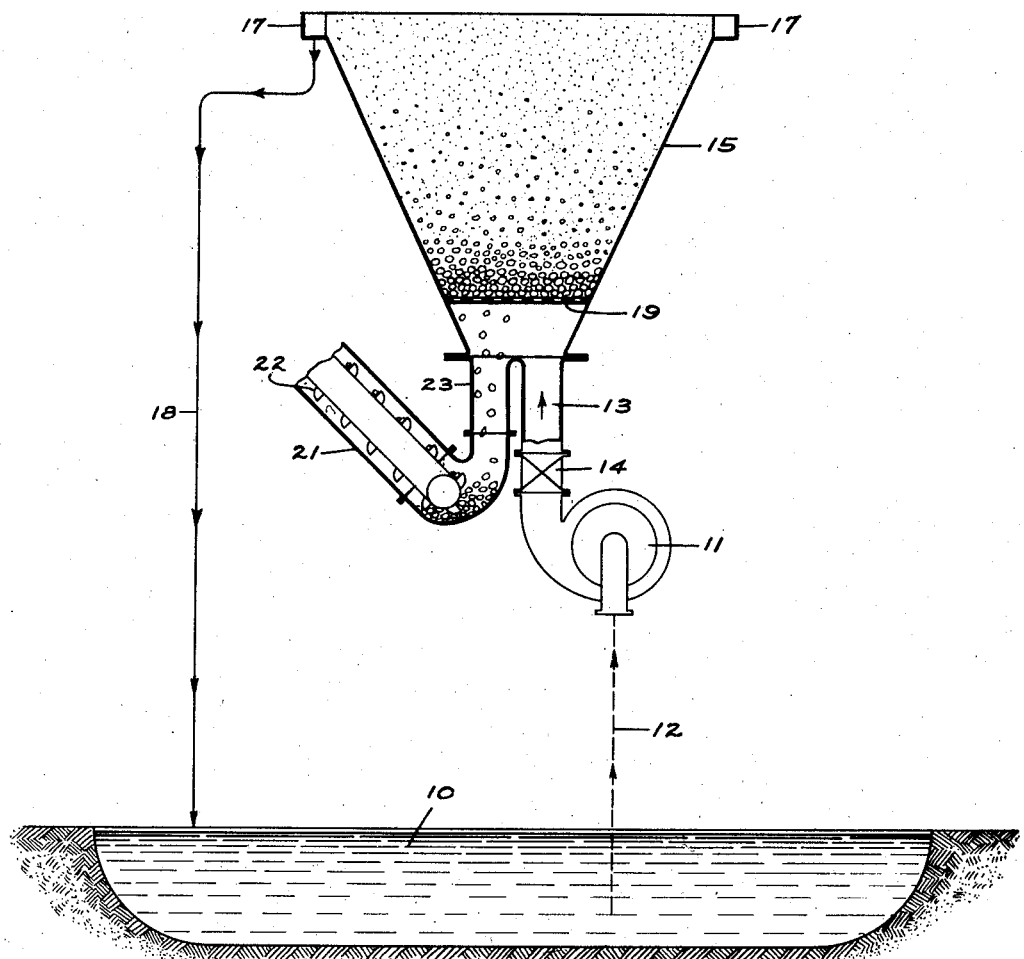
INVENTOR  
George B. Burnham  
BY *White & Frost*  
his ATTORNEYS Patented Feb. 5, 1929.

1,701,295

UNITED STATES PATENT OFFICE.

GEORGE B. BURNHAM, OF RENO, NEVADA, ASSIGNOR TO BURNHAM CHEMICAL COMPANY, OF RENO, NEVADA, A CORPORATION OF NEVADA.

PROCESS OF OBTAINING SODIUM CHLORIDE.

Application filed November 16, 1925. Serial No. 69,275.

My invention relates to a process for obtaining crystalline sodium chloride from saline liquor containing the same and to apparatus which may expediently be used in carrying out the process.

An object of my invention is to provide an economical process for obtaining sodium chloride from saline liquor containing the same and other salts.

Another object of my invention is to provide a process which will produce relatively large salt crystals.

A further object of my invention is to provide apparatus in which salt crystals above a certain size only will be collected.

An additional object of my invention is to provide apparatus in which a diminishing upward velocity is imparted to a saline liquor precipitating salt.

The invention possesses other advantageous features, some of which with the foregoing, will be set forth at length in the following description where I shall outline in full the preferred form of the process and the embodiment of means for practicing the same which I have selected for illustration in the drawing accompanying and forming part of the present specification. In said drawing I have shown one form of apparatus for practicing the process of my invention, but it is to be understood that I do not limit myself to such form since the invention, as set forth in the claims, may be embodied in a plurality of forms.

In the drawing:

Figure 1 is a diagrammatic representation of the apparatus by means of which I practice my process the crystallizing tank and associated parts and the evaporating pond being shown in transverse section, and the direction of flow of the saline liquor being indicated by lines provided with arrow heads.

Broadly considered, the process of my invention preferably comprises flowing saline liquor saturated with a certain salt upwardly with a diminishing velocity through a bed of crystals of the salt, allowing the crystals growing larger than a certain size to drop out of the upward current of liquor into a collecting container, collecting the large salt crystals, and discharging the separated liquor.

I shall describe the process as it is used in connection with the natural saline brine occurring subterraneously at Searles Lake, California, and with which solar evaporation is used. The method of obtaining sodium chloride will be outlined but it will be apparent that other natural or artificial brines may be used and other salts may be recovered.

In Searles Lake brine which is a complicated solution containing several salts, there are always complicated reactions occurring in the solution which interfere with the ready crystallization of salts from a state of supersaturation. Molecules of the various salts are continually dissociating into ions and ions of different salts are uniting to form molecules of other salts. They may form single, double or triple salts, or other elaborate combinations of ions or molecules. In such a complicated solution, interference takes place between the ions and the molecules of the several salts. For instance, a sodium ion and a chloride ion experience some difficulty and delay in uniting to form a sodium chloride molecule, and the sodium chloride molecules have considerable difficulty and undergo delay in finding each other to form a sodium chloride crystal. Molecules of greater solubility may also be momentarily formed which delays crystallization of a salt of lesser solubility. For instance, metaborate ions unite with sodium ions to form sodium metaborate which is much more soluble than sodium chloride. This more soluble salt delays the crystallization of sodium chloride even though the solution may be considerably supersaturated with sodium chloride. Organic material in the solution may further increase the complicated reactions taking place in the brine by forming semi-organic compounds, and thus interfere still more with the ready crystallization of a salt from a supersaturated solution.

It is believed that this delay of crystallization in complicated mixtures is a separate phenomenon from ordinary supersaturation phenomena that may occur in the solution and the result of the phenomenon is that crystallization of a supersaturated salt in a complicated mixture is slow. In the complicated Searles Lake brine, the supersaturated sodium chloride will not crystallize rapidly when one crystal is added as seed. But a large sodium chloride crystal surface offers a guide, so to speak, for the supersaturated sodium chloride molecules in solution, and they can disentangle themselves more rapidly from the complex solution to form upon the crystal surface that is presented. The crystal surface increases the speed of the crystallization process, and in a very complicated solution the surface must be large in order to be effective.

In order to effect the recovery of salt by this process, the saline solution, if not concentrated, must first be evaporated to bring the solution to saturation with the salt. It is preferred to evaporate by natural solar evaporation as that is the cheapest method, but artificial evaporation may be used if desired.

The subterranean Searles Lake brine is pumped into a large pond 10 to evaporate in the sun and wind. One pond can be used to operate the process, or a plurality of ponds may be used. In the latter case, as the brine evaporates and becomes more and more concentrated, it is allowed to flow by gravity from one pond to another. The brine is exposed to the weather until it is saturated with the desired salt, in this case sodium chloride. In the daytime, the sun evaporates water from the liquid and increases its concentration, and at night the salt tends to crystallize out since it is less soluble at the lower night temperature. The brine as it evaporates tends to become slightly supersaturated with sodium chloride. Whether the brine is supersaturated in the ordinary sense of the word or not is not definitely known, but its behavior is somewhat similar, except that seeding with one crystal does not cause rapid crystallization. The word "supersaturated" is used in the claims with this meaning.

In order that most of the crystallization shall not occur in the evaporating pond but shall take place in a container from which the sodium chloride can easily be removed, the brine is caused to flow by suitable means through a mass of sodium chloride crystals held in a suitable container. The pump 11 takes the brine from the pond through a pipe represented by the dotted line 12 and discharges it through the inlet conduit 13, provided with a regulating valve 14, into a crystallizing tank 15. The tank 15 is made with upwardly flaring walls and may conveniently be made of circular horizontal section, so that it is approximately conical. The upward velocity of the brine entering through the inlet conduit 13 is gradually lessened as the liquid approaches the top of the tank. The actual velocity may be regulated by adjusting the valve 14 to regulate the quantity of liquid pumped. At the top of the crystallizing tank, an overflow launder 17 is provided and may be extended entirely around the periphery of the tank. Liquid overflowing the tank 15 is caught in the overflow launder and returned to the pond 10 by means of a pipe represented by the line 18.

A short distance above the bottom of the crystallizing tank, a perforated partition 19 is mounted. The partition is preferably horizontally disposed and serves, by means of its perforations, to distribute the incoming fluid in the tank. The mass of sodium chloride crystals used to initiate the crystallization of that salt from the brine is disposed above the perforated partition. The brine entering through the inlet conduit 13 and passing upwardly through the perforations in the partition 19 comes into intimate contact with the sodium chloride crystals and crystallizes out the sodium chloride it contains in suspension, depositing the newly formed crystals upon the crystals previously in the tank, causing them to grow larger. Salts other than sodium chloride are not crystallized and remain in the upwardly flowing brine. The upward current of the brine tends to keep the smaller crystals at the top of the tank, but as the crystals grow larger, from the new deposit, they consequently grow heavier and drop through the brine toward the bottom of the tank. But due to the upwardly flaring walls, the velocity in the tank increases toward the bottom, and the increased velocity of the brine tend to keep the crystals up. The result is that the crystals are arranged in the tank according to their size, with the very small crystals in the comparatively sluggish brine current at the top of the tank, the crystals of largest size at the bottom of the tank, and the intermediate sizes arranged in proper order in the intermediate space.

The crystals dropping to the bottom of the tank fall through the perforations in the partition 19, if they are small enough to pass therethrough and are, on the other hand, large enough to overcome the rather high velocity of the liquid flowing through the perforations. It will be appreciated that by placing partitions with different size holes in the crystallizing tank, I can easily control the dimensions of the crystals which pass therethrough. It will also be apparent that by varying the size of the holes in the partition 19, and by regulating the valve 14, I can control to a nicety the size of the crystals passing below the partition. This perforated partition also has the advantage of preventing eddy currents in the tank which are apt to be caused by the large jets of brine from the intake conduit. The numerous openings in the partition cause the brine stream to be broken up into many small streams and there are consequently fewer eddy currents. If the slope of the sides of the cone are relatively steep, the partition may be omitted, allowing the brine to flow upward with gradually decreasing velocity, without causing eddy currents. At the top of the tank the brine is relatively quiet and overflows as a practically clear liquor. A plurality of partitions may be used if desired.

The velocity of the upward current should be so regulated that there is but slight tendency to carry small crystals over the top of the tank into the overflow launder 17. The brine which overflows from the launder of the tank is returned to the solar pond to evaporate and again become supersaturated with sodium chloride and the process is repeated so that the entire volume of brine in the pond may be circulated once or even several times during a day through the cone-shaped crystallizing tank. In this way, a large part of the sodium chlorine crystallizing from the brine is formed in the tank where it can readily be recovered.

As shown in the drawing, the crystallizing tank 15 is provided in its bottom with a second opening 23. This opening is a collecting conduit and is preferably arranged adjacent to and parallel with the inlet conduit 13. The collecting conduit communicates with a chamber 21 which houses a bucket conveyor 22, or other suitable elevating mechanism. The chamber 21 receives the large crystals that fall through the partition 19, since there is no upward current in conduit 23 as there is in conduit 13. The crystals collecting in the chamber 21 are of uniform size and are carried by the conveyor 22 into suitable storage bins, not shown, above the crystallizing tank.

The yield of sodium chloride each time the brine is pumped is relatively small in proportion to the volume of the brine, but since the brine may be circulated several times a day, a large yield of sodium chloride is eventually obtained. Some crystallization will take place in the pond but if the circulation of the brine through the crystallizing tank is in proportion to the rate at which the brine becomes supersaturated, the greatest amount of sodium chloride will form in the tank. In some cases it may prove economical to circulate the brine through the tank only when the brine temperature is low and the tendency to crystallization is increased. In other cases, it may be desirable to cool the brine before it is pumped through the crystallizing tank by flooding shallow ponds at night and exposing the brine to the low night temperature, in this way, increasing the yield.

I claim:

1. The process of recovering a salt from liquor containing the same and other salts which comprises causing the liquor to become supersaturated with the salt, bringing the liquor into contact with crystals of the salt by flowing the liquor in such a manner as to hold the salt crystals in suspension in the liquor whereby the supersaturated salt is crystallized onto the suspended crystals, and discharging the liquor.

2. The process of recovering a salt from a liquor containing the same and other salts comprising evaporating and cooling the liquor to effect a condition in the brine which acts similar to supersaturation, flowing the liquor upwardly with diminishing velocity into contact with crystals of the salt and depositing the salts in solution upon the solid salt crystals.

3. The process of recovering a given salt from a liquor containing the same and other salts which comprises evaporating and cooling the liquor to supersaturation with the salt to be recovered, bringing the liquor into intimate contact with agitated crystals of the given salt held in suspension in the brine whereby the given salt in solution in the brine is caused to crystallize onto the solid salt in suspension leaving the other salts in solution, and recovering the given salt crystals.

4. The process of recovering sodium chloride from a liquor containing the same and other salts which comprises causing the sodium chloride to become supersaturated in the liquor, and bringing the liquor into intimate contact with sodium chloride crystals held in suspension in an upward current of the liquor whereby the supersaturated sodium chloride is caused to crystallize.

5. The process of recovering sodium chloride from brine containing the same and other salts which comprises evaporating the brine to supersaturation with sodium chloride, flowing the brine into a container in such a manner that it comes into intimate contact with crystals of sodium chloride held in suspension in an upward flow of the brine whereby the supersaturated sodium chloride is crystallized on the crystals of sodium chloride and recovering the crystals.

6. The process of recovering sodium chloride from a liquor containing the same and other salts which comprises causing the sodium chloride to become supersaturated in the liquor, bringing the liquor into intimate contact with sodium chloride crystals held in suspension in an upward current of the liquor whereby the supersaturated sodium chloride is caused to crystallize, removing the liquor, repeating the process, and recovering the sodium chloride crystals.

7. The process of recovering a given salt from liquor containing the same and other salts which comprises evaporating the liquor to effect supersaturation with the given salt, bringing the liquor into contact with solid crystals of the supersaturated salt held in suspension in an upward flow of gradually decreasing velocity of the liquor, and depositing the supersaturated salt in solution upon the solid salt crystals.

8. The process of recovering a salt from liquor containing the same and other salts, which comprises supersaturating the liquor with the salt to be recovered, flowing the liquor upwardly in a container into contact with crystals of the supersaturated salt to deposit the supersaturated salt onto the crystals, and varying the upward velocity of the flow of liquor to regulate the size of the crystals produced.

9. The process of recovering a given salt from liquor containing the same and other salts which comprises evaporating the liquor to effect supersaturation with the given salt, bringing the liquor into contact with solid crystals of the supersaturated salt held in suspension in an upward flow of gradually decreasing velocity of the liquor, depositing the supersaturated salt in solution upon the solid salt crystals, and controlling the size of the crystals by varying the initial upward velocity of the liquor in which the suspended crystals are held.

10. The process of recovering a salt from liquor containing the same and other salts, which comprises supersaturating the liquor with the salt to be recovered, flowing the liquor upwardly in a container into contact with crystals of the supersaturated salt to deposit the supersaturated salt onto the crystals, decreasing the upward velocity of the flow of liquor to separate the larger crystals from the smaller crystals, and recovering the larger crystals.

11. The process of recovering a salt from liquor containing the same and other salts which comprises causing the liquor to become supersaturated with the salt flowing the liquor upwardly through a plurality of openings into intimate contact with solid crystals of the supersaturated salt to deposit the supersaturated salt upon the solid salt crystals and varying the size of the openings in order to regulate the size of the crystals produced.

12. The process of recovering a salt from liquor containing the same and other salts which comprises supersaturating the liquor with the salt, flowing the liquor through a perforated partition into intimate contact with crystals of the supersaturated salt to deposit the salt in solution upon the suspended salt crystals, the velocity of the current of liquor being gradually decreased as it leaves the partition until it is too low to hold the crystals in suspension, and withdrawing the liquor at the low velocity thereby leaving the crystals behind.

13. The process of recovering a salt from a liquor containing the same and other salts which comprises causing the liquor to become supersaturated with the salt by exposing it in a solar pond to the weather, flowing the liquor into another container in intimate contact with a large number of agitated crystals of the supersaturated salt to deposit the supersaturated salt upon the agitated crystals, separating the liquor from the deposited crystals and flowing it back into the solar pond to become supersaturated again, repeating the process and recovering the crystals.

In testimony whereof, I have hereunto set my hand.

GEORGE B. BURNHAM.